April 14, 1970  S. J. RUPERT  3,506,171
METHOD AND APPARATUS FOR TRIM FINISHING
BLOW MOLDED CONTAINERS
Original Filed Dec. 9, 1964  6 Sheets-Sheet 1

FIG. 1

INVENTOR
SAMUEL J. RUPERT

BY Olsen & Stephenson

ATTORNEYS

FIG. 2

INVENTOR
SAMUEL J. RUPERT
BY Olsen & Stephenson
ATTORNEYS

FIG. 3

INVENTOR
SAMUEL J. RUPERT
BY Olsen & Stephenson
ATTORNEYS

INVENTOR
SAMUEL J. RUPERT
BY Olsen & Stephenson
ATTORNEYS

United States Patent Office 3,506,171
Patented Apr. 14, 1970

3,506,171
METHOD AND APPARATUS FOR TRIM FINISHING BLOW MOLDED CONTAINERS
Samuel J. Rupert, Ann Arbor, Mich., assignor to Hoover Ball and Bearing Company, Saline, Mich., a corporation of Michigan
Original application Dec. 9, 1964, Ser. No. 416,991, now Patent No. 3,417,428, dated Dec. 24, 1968. Divided and this application Apr. 26, 1968, Ser. No. 724,395
Int. Cl. B26f 3/02
U.S. Cl. 225—94                                   3 Claims

ABSTRACT OF THE DISCLOSURE

Apparatus for use in conjunction with an organic plastic blow molding machine wherein sectional molds are provided for defining a cavity in which an article is to be blow molded. A pivotally supported arm is located adjacent to the sectional molds and has gripping means for gripping the tail of the molded article while the mold sections are still closed. The arm is mounted for reciprocable movement between the position for gripping the tail and another position or loading station wherein the gripping means releases the tail with the article being loaded in a prescribed position on a holder carried by the conveyor. The conveyor has two sets of such holders one of which is movable between the loading station and an article trimming station and the second of which is movable between the trimming station and an unloading station. The trimming station provides a mechanism for elevating articles delivered there for trimming purposes and such mechanism maintains these articles in the elevated trim position at the time the conveyor is returned to the initial position wherein the one set of holders can receive additional articles from the blow molding machine. The trimmed articles at the station will then be deposited in the second set of holders for movement to an unloading station when the conveyor repeats its cycle of operation.

CROSS-REFERENCE TO RELATED APPLICATION

This application is a division of copending application, Ser. No. 416,991, filed Dec. 9, 1964 for "Method and Apparatus for Trim Finishing Blow Molded Containers," now Patent No. 3,417,428.

BACKGROUND OF THE INVENTION

This invention relates generally to apparatus for automatically forming plastic containers, and more particularly to an improved method and apparatus for automatically trim finishing blow molded palstic articles.

In many cases, blow molded plastic articles, when removed from the blow molding machine, are encumbered with excess scrap material, and this excess material must be trimmed off in order to provide a finished container. For example, one common type blow molding machine includes a die hard which extrudes a downwardly extending tubular parison open at its lower end. Horizontally movable mold sections disposed below the die head move from positions spaced on opposite sides of the parison into engaged positions in which they pinch the lower end of the parison so as to close it and form a mold cavity around the parison, following which the parison is blown into conformity with the mold cavity. When the plastic cools, the portion of the parison which was pinched together by the molds forms a tail which is integral with and depends from the bottom of the article. Since the tail is formed in this manner, it is always in a predetermined position on the blow molding machine, namely, in a position vertically aligned with the center line of the die head, and it is always, therefore, in a known position with respect to other portions of the blown article. In order to properly form the upper end of the article, which is subsequently stripped and torn from the heated plastic remaining in the die head, it is usually necessary to design the mold so that the upper end of the article is provided with excess plastic. This excess plastic, which includes the ragged edge where the article is torn from heated plastic in the machine, is subsequently removed to provide a finished container. In finish trimming such an article, so as to remove the tail and also to remove the excess material at the upper end of the article, it is desirable to provide automatic apparatus which is oriented with a portion of the blown article which is always in the same position both on the machine and on the article. It is also desirable to provide trimming apparatus which moves the blown article in a downward direction away from the die head so as not to interfere with a subsequently formed downwardly moving parison to thereby avoid delays and increases in cycle times in the operation of the machine, and it is desirable to provide trimming apparatus which is capable of simultaneously handling a plurality of molded articles.

SUMMARY OF THE INVENTION

It is an object of this invention, therefore, to provide an improved method and apparatus for trim finishing blow molded articles which accomplishes the above described objectives, is oriented with respect to the tails on the articles formed in the molding machine, is disposed so that a blow molded article is initially moved downwardly away from the die head to a predetermined position for trimming, includes the steps of automatically grasping the tail on a blow molded article while still in the mold and subsequently moving it downwardly so as to strip the article from the machine and then move the article into a predetermined position for trimming, includes improved indexing apparatus for automatically moving molded articles from a loading station to a trimming station where they are trimmed to form finished containers and then moved to an unloading station in a timed relation with the operation of the machine so as to avoid delays in the operation of the machine, and which includes improved trim apparatus at the trim station for removing the excess material.

In the method and apparatus of this invention, the mold sections are shaped to provide access to a portion of the tail while the article is enclosed within the mold sections. A scissors unit, capable of grasping the exposed portion of the article tail, is mounted for movement along a path which extends into the access opening in the mold. The scissors unit, which includes gripping fingers which are normally spaced, is actuated as it approaches the molds so that the gripping fingers are moved into grasping engagement with the exposed portion of the article tail. The mold sections are moved apart, following which the scissors unit is moved along a downwardly extending path with the fingers in grasping engagement with the article tail. As a result, the article is stripped from the die head and moved downwardly with the scissors unit. A conveyor, having holders shaped to receive blown plastic articles from the blow molding machine, is positioned so that the scissors unit will deposit the blown articles on the holders. At such time the scissors unit is actuated so as to release the gripping fingers from the article tail. The conveyor is indexed to move newly molded articles from the loading station to a trim station which operates automatically to remove the articles from the holders onto which they were loaded and trim the articles by removing the tails and excess material from the tops. During trimming, the conveyor returns the holders on which the articles were initially opsitioned to the loading station and positions other holders at the trim station. The trimming operation is concluded substantially concurrently with delivery of additional newly molded articles to the holders at the loading station. Consequently, during the next operation of the conveyor to index from the loading station to the trim station, finish trimmed containers at the trim station are moved to an unloading station. In the case of thin wall plastic articles, sufficient coupling is acocmplished at room temperature to enable immediate transfer of the articles from the loading station to the trim station without any specific provision for forced cooling of the articles. In the case of thick wall containers, an intermediate cooling station is provided or, in the alternative, a combination cooling and trim station is substituted for the trim station.

Further objects, features and advantages of this invention will become apparent from a consideration of the following description, the appended claims, and the accompanying drawings.

DESCRIPTION OF THE PREFFERED EMBODIMENTS

Before explaining the present invention in deail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
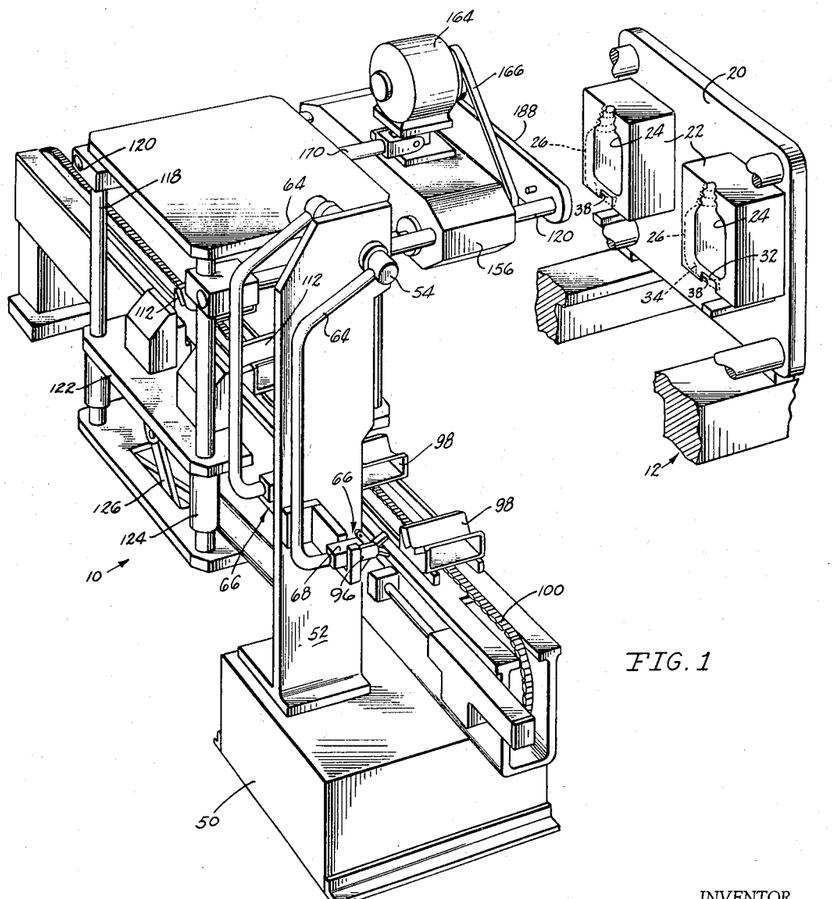
FIGURE 1 is a perspective view of the trimming apparatus of this invention, shown in assembly relation with a bolw molding machine, only a fragmentary portion of which is shown.
Figure 2:
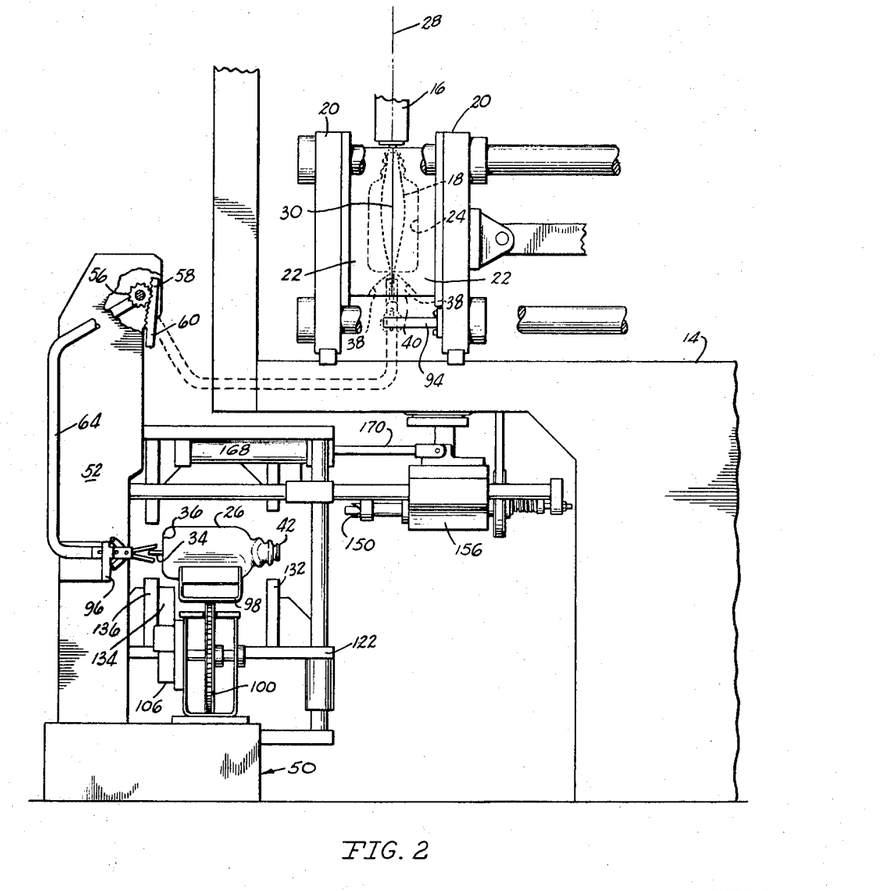
FIGURE 2 is a side elevational view of the structure shown in FIG. 1, illustrating the bottle grasping unit which removes plastic articles from the blow molding machine in position for grasping an article in broken lines and in position releasing an article in solid lines.

With reference to the drawing, the improved trimming apparatus of this invention, indicated generally at 10, is illustrated in FIG. 1 in assembly relation with a blow molding machine 12, only a fragmentary front end portion of which is shown since only the illustrated portions of the machine 12 are pertinent to the apparatus 10 of this invention. For details of the machine 12, reference is made to copending application Ser. No. 236,382, filed Nov. 8, 1962 and copending application Ser. No. 404, 759, filed Oct. 19, 1964, both of which are assigned to the assignee of this invention. As shown in FIGS. 1 and 2, the machine 12 includes a main frame 14 and a plurality of vertical die heads 16, only one of which is shown, which are supplied with plastic in a heated semi-fluid condition so that each die head 16 is capable of forming a downwardly extending tube or parison 18 of plastic, the lower end of which is originally open. Mold carrying platens 20 are slidably mounted on the main frame 14 at a position below the die heads 16 and carry mold sections 22 each of which is formed with a cavity 24 of a shape corresponding usually to one half of the article 26 which is to be molded in the mold formed when the mold sections 22 are engaged as shown in FIG. 2. Each mold section 22 is formed with a number of cavity halves 24 corresponding to the number of die heads 16 so that when the mold sections 22 are engaged as shown in FIG. 2, a mold cavity is disposed below each die head at a position in substantially vertical alignment with a vertical plane 28 extending through the center line of the die heads 16. The plane 28 also passes through the line of engagement 30 of the mold sections 22. When the parisons 18 are originally extruded from the die heads 16, they have lower open ends, and each parison 18 is of a length to extend below the bottom ends of the cavity halves 24. At such time, the mold sections 22 are spaced horizontally on opposite sides of the parison 18. Subsequently, the mold sections are moved toward each other into the engaged positions shown in FIG. 2 in which webs 32 on the mold sections 22 immediately below the cavity halves 24 engage a lower end portion of the parison 18 and pinch this portion so as to close the lower end of the parison 18 as shown in FIG. 2.

Each parison 18 is subsequently blown or expanded into conformity with the cavity formed by the halves 24, by ejecting air under pressure through the die head 16, to thus form the containers 26. The portion of the parison 18 which was squeezed between the webs 32 forms a tail 34, located in the plane 28, which is integral with the bottom wall 36 of the container 26. There is sufficient space between the webs 32 on engaged mold sections 22 to prevent the tail 34 from being severed from the container 26 in the mold sections 22, but the tail 34 is sufficiently thin at its point of attachment to the bottom wall 36 to enable it to be readily torn from the bottom wall 36.

As shown in FIGS. 1 and 2, the mold sections 22 are formed at their lower ends with recesses or notches 38 to form a downwardly opening cavity 40 in the mold which is formed when the sections 22 are engaged. This cavity 40 is immediately below the web 32 and is of a size such that a portion of the tail 34 extends into the cavity 40 when the container 26 is still in the mold, as shown in FIG. 2. A cavity 40 is of a length, measured in a horizontal direction, less than the width of a cavity half 24 so that the mold sections 22 engage and flatten the parison on opposite sides of the cavity 40 to thereby provide a tail 34 of a fairly flat construction. This construction of the mold sections 22 enables mechanical grasping of the tail 34 while the container 26 is in the mold so that when the mold sections 22 are moved apart to positions spaced on horizontally opposite sides of the container 26, a generally downwardly extending force can be applied to the tail 34 to strip the molded container 26 from the heated plastic remaining in the die head 16. This stripping of the article 26 from the die head 16 provides a jagged edge on the upper end portion 42 of the article 26 which must be subsequently trimmed off, along with the tail 34 to provide a finished container.

The function of the apparatus 10 is to automatically trim the tail 34 from each molded article 26 and trim the upper portion 42 of each article 26, and in order to permit the apparatus 10 to automatically perform this function, each molded article 26 must be loaded onto the apparatus 10 at a predetermined position and each article 26 must be in a predetermined oriented position with respect to the apparatus 10 at loading. This is accomplished according to this invention, by positioning the tail 34 on each molded article 26 in a predetermined position on the apparatus 10, since the tail 34 is always in a known position on the machine 12 and is always in a known position with respect to the other portions of the article 26 to which it is attached.

The apparatus 10 includes a main frame 50 provided with an upstanding column 52. A shaft 54 is rotatably supported on the column 52 adjacent the upper end thereof, and a gear 56 is attached to the shaft 54 so that when the gear 56 is rotated, a corresponding rotation of the shaft 54 is obtained. A rack 58, positioned in driving meshing engagement with the gear 56 is secured to the upper end of a piston rod 60 for a hydraulic cylinder assembly 62 mounted on the main frame 50. As a result, when the piston rod 60 is extended the arms 64 which are secured at their upper ends to the shaft 54 and are disposed on opposite sides of the column 52 are rotated in a counter-clockwise direction as shown in FIGS. 1 and 2.

Figure 7:
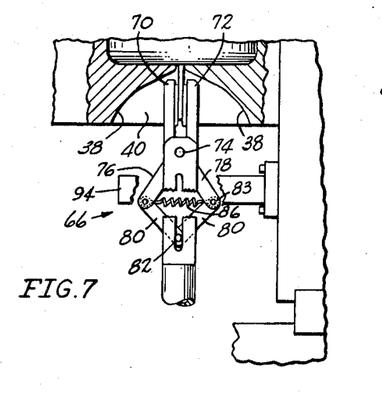
FIGURE 7 is an enlarged detail view showing the scissors unit in the apparatus of this invention, illustrating the unit in article grasping position.
Figure 8:
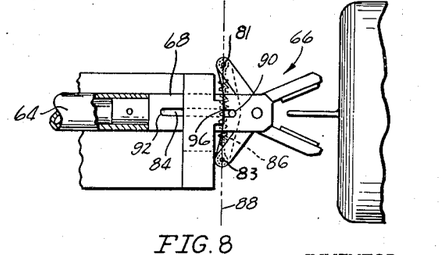
FIGURE 8 is an enlarged detail view, like FIG. 7, showing the scissors unit in an article releasing position.

A scissors unit 66, capable of grasping the tail 34 on a molded article 26 is mounted on the lower end of each arm 64. Since the scissors units 66 are identical, only one will be hereinafter described in detail. As shown in FIGS. 1, 7 and 8, a scissors unit 66 includes a bifurcated body 68 secured to the end of an arm 64. A pair of gripping fingers 70 and 72 movable between the parallel and relatively diverging positions shown in FIGS. 7 and 8, respectively, are pivotally supported on a transverse pin 74 carried by the body 68. The finger 70 has an extension 78, and the finger 72 has an extension 76 disposed in relatively diverging positions so that when the extensions 76 and 78 are moved away from each other the finger members 70 and 72 are also moved away from each other. A pair of lins 80 are pivotally supported at their ends on pins 81 and 83 at the terminal ends of the extensions 76 and 78, respectively. The opposite ends of the links 80 are connected pivotally by a pin 82 which slides in a slot 84 in the body 68. A spring 86 extends between the pins 81 and 83 so as to urge the finger extensions 76 and 78 toward each other. The pin 82 extends out of the body 68 through the slot 84 and is movable in the slot between overcenter positions on opposite sides of an imaginary line 88 which extends between the pivot pins 81 and 83.

The slot 84 has a pair of ends 90 and 92 hereinafter referred to as the front and rear ends for convenience of description. When the pin 82 is moved toward the imaginary line 88, against the pressure of spring 86, the links 80 act to move the finger extensions 76 and 78 apart so as to move the fingers 70 and 72 apart. Thus, as the pin 82 is moved toward the slot end 90, from the end 92, the fingers 70 and 72 are moved away from each other until pin 82 passes the line 88. As soon as the pin 82 passes the line 88, so that the links 80 are in what is normally referred to as the "overcenter position," the spring 86 continues to urge the pin 82 toward the slot end 90. The slot end 90 is located closely adjacent the line 88. As a result, when the pin 82 is between the line 88 and the slot end 90, the spring 86 will maintain the pin 82 in an overcenter position in which the fingers 70 and 72 are in diverging positions by virtue of the location of the slot end 90 adjacent the line 88.

When the pin 82 is moved in the opposite direction, namely, toward the slot end 92, from the end 90, as soon as it passes the line 88, the spring 86 will tend to move the pivot pins 82 and 84 toward each other so as to move the fingers 70 and 72 toward engaged positions, which takes place prior to engagement of pin 82 with the slot end 92. Thus, the pin 82 is movable toward the slot end 90 to move the fingers 70 and 72 into "open positions" and is movable in an opposite direction toward the slot end 92 to move the fingers 70 and 72 toward "closed positions," and the spring 86 functions to maintain the fingers in both open and closed positions until the pin 82 is again moved in the slot 84 to a different overcenter position.

A stationary stop member 94, mounted on the blow molding machine 12 at any desired position in the path of movement of the actuating pin 82, and illustrated in FIG. 2 mounted on one of the platens 20, is engageable with the pin 82 during movement of the unit 66 toward the notch 40 so as to move the pin 82 in the slot 84 to a position between the line 88 and the slot end 92, so that the spring 86 moves the fingers 70 and 72 into closed positions in engagement with opposite sides of the tail 34 in the cavity 40. A similar stop 96 is mounted on the column 52 at a position engageable with the pin 82 for moving it to an overcenter position between line 88 and slot end 90. In this position of pin 82, the fingers 70 and 72 are moved by spring 86 to open positions. Thus, the unit 66 on each arm 64 is movable by the arm 64 upwardly into an access cavity 40 into gripping engagement with the tail 34 on a molded article 26 within the mold sections 22. When the mold sections 22 are moved apart, after the article 24 therein has cooled, the arm 64 is movable in a reverse direction, by retracting the piston rod 60, so as to move the unit 66 downwardly and exert a downward force on the article 26. The unit 66 can be used in conjunction with a stripper (not shown), such as shown in the copending application hereinbefore referred to, which moves downwardly against the top side of an article 26 so as to strip it from plastic remaining in the die head 16 concurrently with downward movement of unit 66 so as to remove the article 26 from between mold sections 22, or the downward force of unit 66 on article 26 can be used to strip it from the plastic remaining in the die head 16, as well as to remove the article from between mold sections 22.

The arm 64 is moved in this clockwise direction, as viewed in FIG. 2, to move the pin 82 into engagement with the stop 96 to effect movement of the fingers 70 and 72 to open positions in which they release the tail 34 grasped therebetween. At such time, the container 26 is in a predetermined oriented position for trimming. In the illustrated embodiment of the invention, two arms 64 cooperate with two mold cavities on the machine 12 so as to simultaneously move two molded articles 26 downwardly into the predetermined positions for trimming described above, which in the illustrated embodiment of the invention are horizontal positions. In this case, the articles 26 are at this time supported on a pair of holders 98 shaped to support the molded articles 26 in the horizontal positions thereof shown in FIG. 2.

The pair or set of holders 98 are spaced apart a fixed distance corresponding to the spacing of the pair of scissors units 66 and are secured to a conveyor chain 100 which is of endless type and is supported on a pair of sprockets 102 on the main frame 50. A hydraulic cylinder assembly 104 on the main frame 50 cooperates in a well known manner with a rack and gear assembly, indicated generally at 106, to rotate one of the sprockets 102 so as to move the chain 100 a distance corresponding to the horizontal spacing between what will be hereinafter referred to as a "loading station" 108 and a "trim station" 110. The spacing between the stations 108 and 110 corresponds to the spacing between the pair of holders 98 on the chain 100 and a second pair of identical holders 112 which are secured to the chain 100 at a position spaced longitudinally from the holders 98. Thus, when the cylinder assembly 104 is actuated to index the conveyor 100, the pair of holders 98 at the loading station 108 are movable to the left as viewed in FIG. 3 to the positions illustrated for the pair of holders 112 at the trim station 110. The holders 112 are in turn moved a corresponding distance to the left in FIG. 3 to what is hereinafter referred to as an "unloading station" 114.

The trim station 110 includes a subframe 116 which is mounted on and extends upwardly from the main frame 50 and includes four upright guide rods 118 and a pair of horizontal guide rods 120. An elevator platform 122, secured to bearings 124 which are slidably mounted on the guide rods 118, is connected to a linkage assembly 126 which is actuatable, on extension of the piston rod 128 for a cylinder assembly 130 on the main frame 50, to move the platform 122 a predetermined distance upwardly (FIG. 5), and on retraction of the piston rod 128 to move the platform 122 to the lower position illustrated in FIG. 3. A pair of carrier plates 132 and 134 are mounted on the platform 122 at each position thereon corresponding to the location of an article holder 98 or 112 when the article holders are positioned at the trim station 110. When the platform 122 is in its lower position illustrated in FIG. 3, the carrier plates 132 and 134 are positioned below articles 26 delivered to the trim station 110 by the holders 98 and on opposite sides of the holders 98. On upward movement of the platform 122, the carrier plates 132 and 134 are moved upwardly into supporting engagement with articles 26 on the holders 98 so as to move the articles upwardly to trim positions. The trim position of an article 26 is illustrated in FIG. 4.

Figure 3:
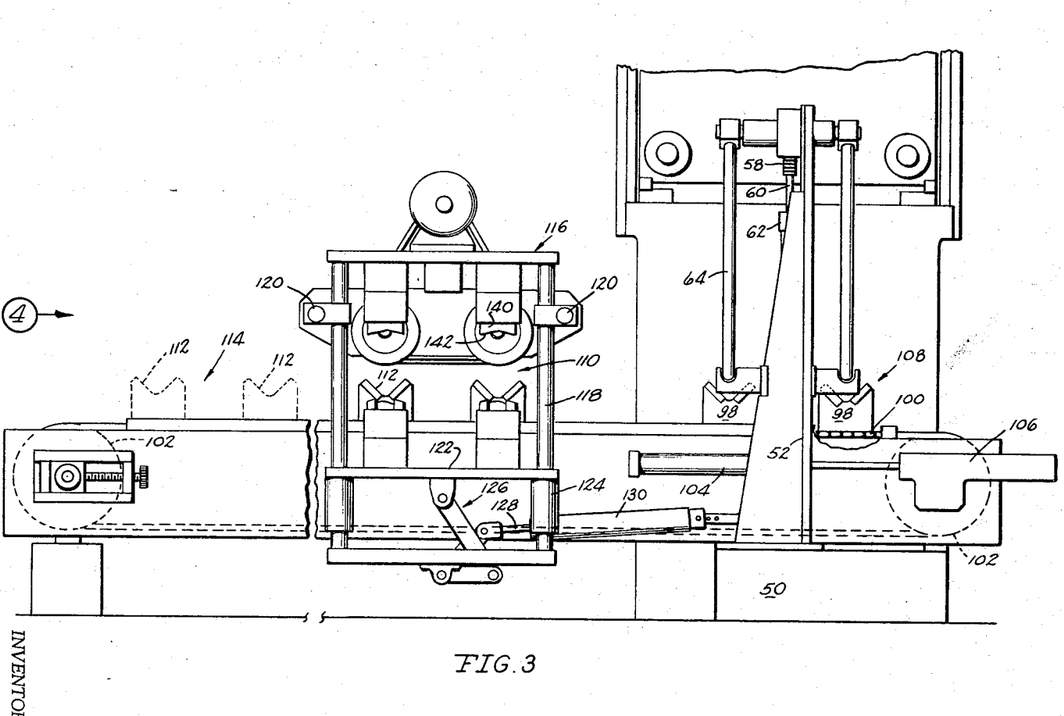
FIGURE 3 is a front view of the structure shown in FIG. 1, showing the conveyor in the trimming apparatus of this invention in position for receiving articles from the blow molding machine and showing the elevator at the trim station in its lower position.

Each carrier plate 132 is shaped to engage and provide a nest for the front end portion 42 of the article 26 and each carrier plate 134 is shaped to engage and provide a nest for the body of the article 26 adjacent the bottom wall 36. A tail holding bar 136 is slidably mounted on each carrier plate 134 for up and down sliding movement relative thereto. A spring 138 extending between the platform 122 and each tail bar 136 urges the tail bar 136 upwardly into engagement with the underside of the tail 34, which is at this time located in a substantially horizontal plane, on an article 26 supported on the carrier plate 134. Prior to the time each article 26 reaches its trim position illustrated in FIG. 4, a stationary downwardly extending stripper plate 140, mounted in a fixed position on the subframe 116 engages the top side of the tail 34. As shown in FIGS. 3 and 5, the bottom or working edge 142 of each of the plates 140 is of a somewhat inverted V-shape. Consequently, as the tail 34 on an article 26 is moved against a stripper plate 140, the stripper plate 140 acts to tear the tail 34 off the article bottom wall 40. The inclination of the working edge 142 of the stripper plate 140 facilitates tearing of the tail 34 and provides for a tearing of the tail from opposite ends thereof toward the center. Each tail bar 136, which is vertically aligned with a stripper plate edge 142 and is of a shape complementary thereto, moves downwardly against the pressure of the spring 138 during tearing of the tail so that once the tail has been trimmed from the article 26 it remains gripped between the bar 136 and the plate 140, as shown in FIG. 5, until the platform 122 is subsequently moved downwardly.

Figures 4, 9, 10:
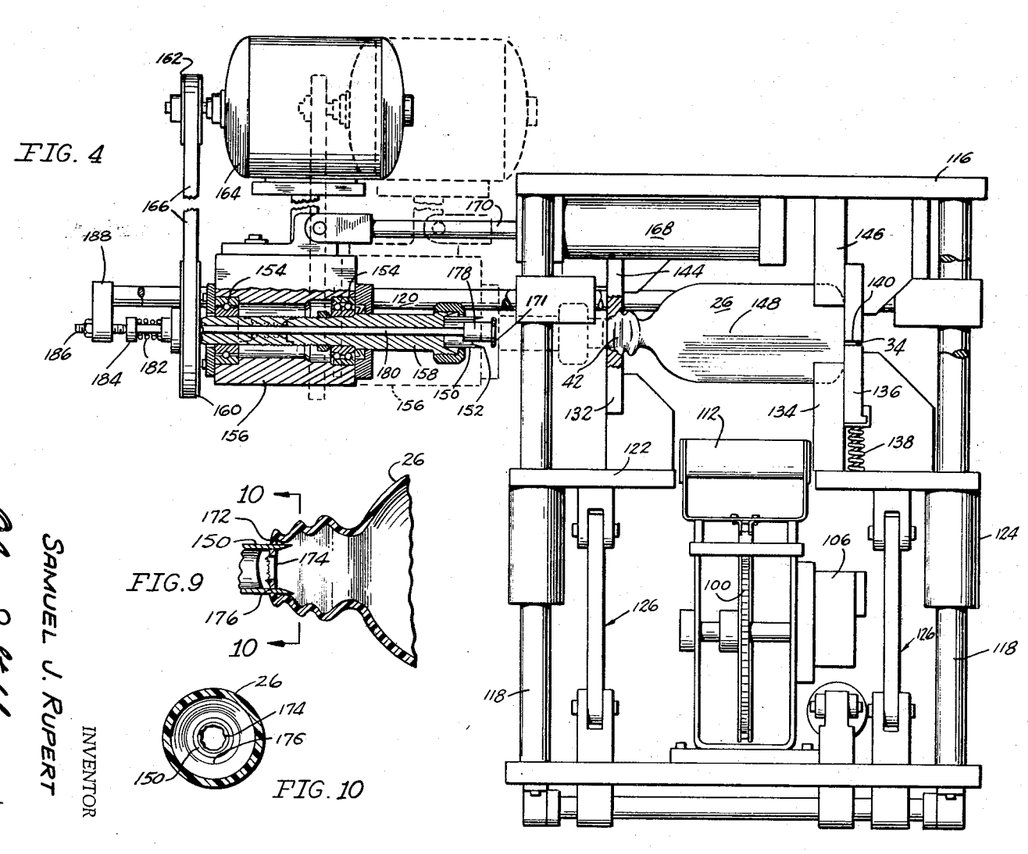
FIGURE 4 is an enlarged side view of the trimming station in the apparatus of this invention, as seen from the direction in which the arrow 4 is pointing in FIG. 3, with some parts broken away and other parts shown in section for the purpose of clarity.
FIGURE 9 is an enlarged fragmentary detail view of a portion of the trim station structure showing the cutter head in operative position.
FIGURE 10 is a transverse sectional view of the trim station apparatus looking along the line 10—10 in FIG. 9.
Figure 5:
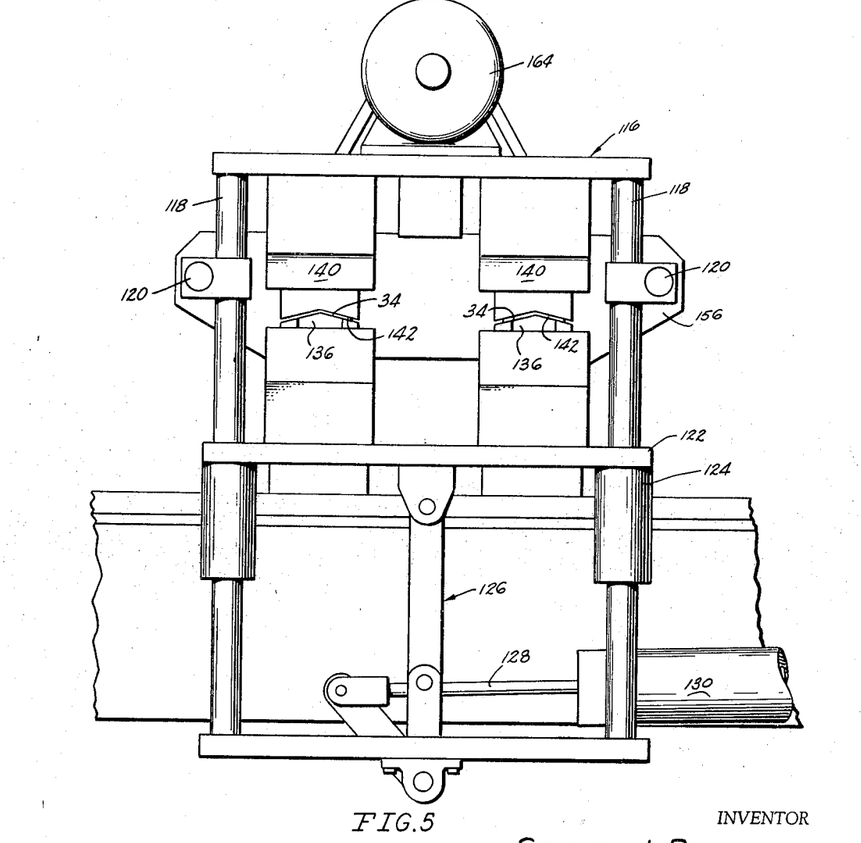
FIGURE 5 is an enlarged fragmentary front view showing the trim station in the apparatus of this invention, and illustrating the elevator in a raised position.

In the trim position of an article 26, as shown in FIG. 4, stop plates 144 and 146 on the subframe 116 cooperate with the carrier plates 132 and 134, respectively, to clamp the article 26 in a fixed position. In this position, hereinafter referred to as the trim position, the axis 148 of the article 26 is horizontally aligned with the axis of rotation of a rotatable cutter head 150 having a cuting edge 152. The cutting edge 152 is formed with one or more arcuate sections which travel in a circuit path during rotation of head 150, so that the edge 152 is sometimes referred to hereinafter as a circular edge. The cutter head 150, which is of tubular shape, is secured to a hollow shaft 158 which is rotatably mounted on bearings 154 carried by a bracket 156 which is slidably supported on the guide rods 120. The hollow shaft 158 is secured to a pulley 160 which is vertically aligned with a second pulley 162 driven by a motor 164 mounted on the bracket 156. A drive belt 166 extends about the pulleys 162 and 160. A fluid actuated cylinder assembly 168, mounted on the subframe 116, has its piston rod 170 connected to the bracket 156 so that when the piston rod 170 is reciprocated, the bracket 156 is movable between the retracted and advanced positions shown in solid and broken lines, respectively, in FIG. 4. When the bracket 156 is moved to its advanced position shown in broken lines, the cutter head 150 is movable into the upper end portion 42 of the article 26 as shown in FIG. 9. During such movement, the cutter head 150 cuts an annular slug 171 from the top wall 172 of the article 26. As shown in FIG. 9, the top wall 172 of the article 26 is formed, as it comes from the die head 16 with an opening 174 which is smaller than the ultimate opening desired in a finished container which is to be formed from the blown article 26. This initial forming of the opening 174 so that it is undersize enables trimming of the upper end portion 42 of the article 26 so as to provide a clean, trimmed opening of the desired size.

When the cutter head 150 is subsequently moved to the retracted position shown in full lines in FIG. 4, it carries the slug 171 with it. The slug 171 engages a slug remover head 178 which is mounted on a rod 180 which extends through the hollow shaft 158. A spring 182, extended between a flange 184 on the rear ends of the rod 180 and the hollow shaft 158 maintains the head 178 in a position within the cutter head 150, and out of the way of cutting edge 152, during movement of cutting edge 152 into the molded article 26. An adjustable stop screw 186 mounted on a bracket 188, carried by the guide rods 120, is engageable with the flange 184 to define a position of the slug removal head 178 in which the forward end thereof is disposed in a vertical plane between the cuting edge 152 and the article 26 in the retracted position of the bracket 156. As a result, the head 178 functions to push the slug 171 out of the cutter head 150 when the cutter head is moved to its retracted position.

In the operation of the apparatus 10, assume that a pair of plastic articles 26 have been formed in the mold sections 22 and are at this time positioned within the cavity halves 24. The rack actuating cylinder assembly 62 is operated to rotate the arms 64 from their positions shown in FIG. 1 to their broken line positions shown in FIG. 2 in which the scissors units 66 thereon project into the cavities 40 below the mold cavities 24. By virtue of the location of the actuating stop 94, the scissors assemblies 66 have their fingers 70 and 72 positioned in grasping engagement with the tails 34 on the plastic articles 26 in these positions of the unit 66. The mold sections 22 are moved apart following which the rack actuating cylinder assembly 62 is actuated to rotate the arms 64 in a reverse direction so as to move the scissors units 66 downwardly and strip the blown articles 26 from the die heads 16. The arms 64 move the articles 26 along an arcuate path to positions corresponding to the positions illustrated for the articles 26 in FIG. 2 in which the tails 34 on the articles 26 are disposed in substantially a horizontal plane. At this time, the stationary pin actuating stop 96 provides for movement of the fingers 70 and 72 in the scissors units 66 to release positions with respect to the tails 34 previously grasped thereby The holder members 98 are at this time in positions supporting the articles 26.

The indexing cylinder assembly 104 is then operated to move the conveyor chain 100 so as to move the holders 98, with the articles 26 thereon, from the loading station 108 to the trim station 110. The platform actuating cylinder assembly 130 is actuated to raise the platform 122 so as to lift the pair of articles 26 on the holders 98 upwardly into the trim positions corresponding to the position illustrated for the article 26 in FIG. 4. While the articles 26 are in their trim positions, and are being trimmed, by removal of the tail 34 and the slug 171, cylinder assembly 104 is actuated to index the conveyor chain 100 in a reverse direction to return the holders 98 to the loading station 108.

As the articles 26 were being removed and moved downwardly away from the die heads 16, the die heads 16 were operating to extrude downwardly traveling parisons 18.

Thus, the movement of the arms 64 so as to move the molded articles 26 downwardly have the advantage of eliminating any interference of the molded articles with the newly forming parisons. Consequently, while the first molded articles are being moved to the loading station 108, indexed to the trim station 110, and trimmed, a second pair of articles 26 is being formed in the mold sections 22. While this second pair of articles 26 is being moved by the arms 64 and the scissors units 66 onto the holders 98 at loading station 108, the first pair is being trimmed at the trim station 110, and the cylinder assembly 130 is operated to return the platform 122, with the finally trimmed and finished containers thereon, downwardly. As the carrier plates 132 and 134 on the platform 122 move downwardly past the pair of holders 112 at trim station 110, the trimmed containers are deposited on the holders 112. As a result, when the indexing cylinder 104 is next actuated to move the second pair of molded articles 26, which are at this time supported on the holders 98, from the loading station 108 to the trim station 110, the trimmed and finished containers on the holders 112 are moved to the unloading station 114. At the unloading station 114, the trimmed and finished containers are removed from the holders 112. Consequently, when the cylinder 104 is actuated to return the holders 98 to the loading station 108, empty holders 112 are moved to the trim station 110 in preparation for receiving another pair of trimmed and finished containers.

Figure 6:
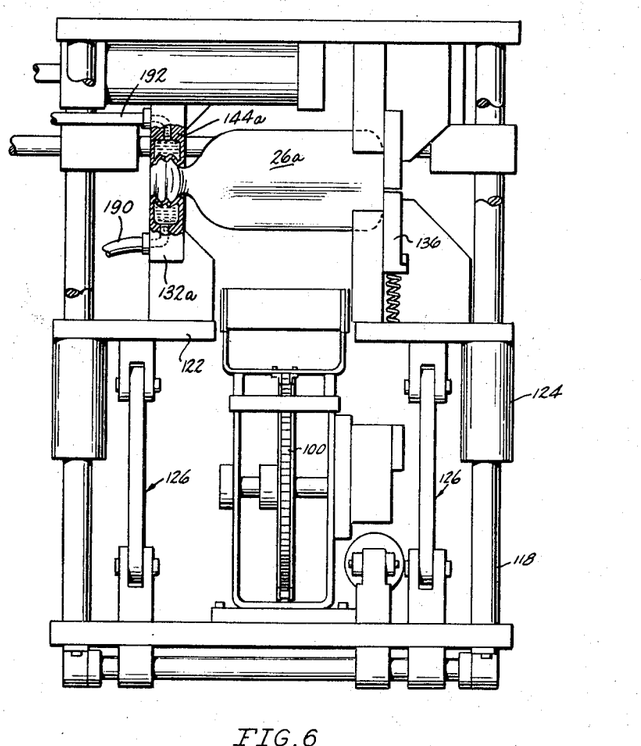
FIGURE 6 illustrates a modified form of trim station which includes structure for forced cooling articles to be trimmed.

In the case of thin wall containers 26, the containers 26 are cooled sufficiently by the time they reach the trim station 110 to enable effective trimming by the cutter head 150. However, in the event a container, such as the one indicated at 26a in FIG. 6 is of a thick wall construction, some additional cooling of the top portion 42 of the container 26 is necessary prior to trimming by the cutter head 150. Accordingly, FIG. 6 illustrates structure for accomplishing this additional cooling, and in the embodiment of the invention shown in FIG. 6, a carrier plate 132a, similar to the plate 132 previously described, and a stop 144a, similar to the stop 144, previously described, are of a hollow construction and are provided with conduit means, such as indicated at 190 and 192 for circulating a cooling fluid through the interiors of the members 132a and 144a. Thus, the contact of the cooling fluid with the container portion 42 will effect rapid cooling thereof at the trim station 110 sufficient to enable effective trimming. The apparatus of this invention has been illustrated and described in connection with the simultaneous trimming of two articles 26, but it is to be understood that one of the features of this apparatus is its ready adaptability to the simultaneous trimming of a larger number of articles.

It is claimed:

1. Apparatus for trimming a hollow plastic article having a bottom wall provided with an integral depending tail and a top wall, said apparatus comprising a frame, stop means on said frame positioned for engagement with one side of said article to define a trim position of said article, means on said frame for moving an article into a position against said stop means, a rotatable cutter head aligned with said article top wall in said trim position of the article, means on said frame connected to said cutter head for moving said cutter head in a direction axially thereof toward said article when in the trim position thereof, means for retracting said cutter head in an opposite direction, means for rotating said cutter head in a circular path, slug removal means on said frame disposed within said path, said head being moved relative to said slug removal means during retraction of said cutter head to provide for removal of slugs from within said cutter head, and means on said frame disposed in the path of said tail during movement of said article to said trim position for tearing said tail from said article bottom wall.

2. Apparatus for trimming a hollow plastic article having a bottom wall provided with an integral depending tail and a top wall and an axis extending through said walls, said apparatus comprising a frame, stop means on said frame positioned for engagement with the upper side of said article to define a trim position of said article in which said article is in a position in which said axis is substantially horizontal, means on said frame for moving an article upwardly into a position against said stop means, a rotatable substantially tubular cutter head aligned with said axis and adjacent said top wall in said trim position of the article, means on said frame for rotating said cutter head, means on said frame connected to said cutter head for moving said cutter head during rotation thereof in a direction axially thereof toward said top wall when in the trim position thereof so as to cut a slug of waste material from said top wall, means for retracting said cutter head in an opposite direction, and means on said frame disposed in the path of said tail during movement of said article to said trim position for tearing said tail from said article bottom wall.

3. Apparatus for trimming blow molded plastic articles comprising a horizontally movable conveyor, means defining an article trim station and an article loading station a predetermined distance spaced from and to one side of said trim station, said stations being disposed adjacent and in fixed positions with respect to said conveyor, a first set of article holding members on said conveyor, a second set of article holding members spaced from said first set, means at said loading station for delivering articles to be trimmed into supported positions on said first set of holding members, said second set of holding members being spaced said predetermined distance from said first set so that said second set is disposed at said trim station when said first set is at said loading station, means for indexing said conveyor in one direction to move said first set of holding members to said trim station and move said second set to a position on the opposite side of said trim station from said loading station, elevator means at said trim station for moving articles upwardly off said first set of holding members into trim positions, means for indexing said conveyor in a reverse direction to return said first set of holding members to said loading station and return said second set of holding members to said trim station, means at said trim station for trimming articles when in said trim positions, said elevator means being operable to move trimmed articles at said trim station downwardly onto said second set of holding members.

References Cited

UNITED STATES PATENTS

| 3,228,086 | 1/1966 | Brown et al. | 29—33 |
| 3,351,981 | 11/1967 | Rupert | 83—914 X |

JAMES M. MEISTER, Primary Examiner

U.S. Cl. X.R.

77—5; 225—97, 103